United States Patent [19]

Brunnett et al.

[11] 3,777,146

[45] Dec. 4, 1973

[54] INFORMATION DENSITY SYSTEM FOR SCINTILLATION DEVICE AND METHOD OF OPERATION

[75] Inventors: Carl J. Brunnett, Mayfield Heights; Basil N. Ioannou, Bedford, both of Ohio

[73] Assignee: Picker Corporation, Cleveland, Ohio

[22] Filed: June 23, 1972

[21] Appl. No.: 265,481

[52] U.S. Cl...........................250/369, 307/223

[51] Int. Cl........................................... G01t 39/18

[58] Field of Search.....................250/71.5 S, 71.5; 307/223

[56] References Cited

UNITED STATES PATENTS 3,449,586 6/1969 Serra.........................250/71.5 S

*Primary Examiner*—James W. Lawrence
*Assistant Examiner*—Harold A. Dixon
*Attorney*—Henry W. Collins et al.

[57] ABSTRACT

A scintillation scanner having an information density indicator system for counting the number of electrical pulses representative of radiation activity which occur during a predetermined increment of movement of a detection probe and dividing the number of counted pulses by a selected line spacing distance in order to provide direct indication of information density. The information density indicator system utilizes counting circuitry for counting the number of pulses which occur during a predetermined interval of time and scaling circuitry for scaling the number of pulses by a factor which is dependent upon a selected distance of line spacing. The system also incorporates storage circuitry and digital-to-analog conversion circuitry for storing and processing the signals for application to an indicator device.

15 Claims, 3 Drawing Figures

INFORMATION DENSITY SYSTEM FOR SCINTILLATION DEVICE AND METHOD OF OPERATION

CROSS REFERENCES TO RELATED PATENTS AND PATENT APPLICATIONS

U.S. Pat. No. Re 26,014, to Joseph B. Stickney et al., entitled, "Scintillation Scanner," issued on May 3, 1966, and assigned to the assignee of the present Application.

U.S. Pat. No. 3,159,744, to Joseph B. Stickney et al., entitled, "Scintillation Scanner PhotoCircuit," issued on Dec. 1, 1964, and assigned to the assignee of the present application.

U.S. Patent application Ser. No. 660,823, to Carl J. Brunnett et al. entitled, "Scintillation Recording Device," filed on Aug. 15, 1967, and assigned to the assignee of the present application.

U.S. Patent application Ser. No. 156,913, to Carl J. Brunnett et al., entitled "High Speed Color Printer for Scintillation Scanner," filed June 25, 1971 and assigned to the assignee of the present application.

U.S. Patent application Ser. No. 156,912 to Carl J. Brunnett et al., entitled "Automatic Calibration System for a Scintillation Device and Method of Operation," filed June 25, 1971, and assigned to the assignee of the present application.

U.S. Patent application Ser. No. 265,625 to Carl J. Brunnett et al., entitled "Automatic Dot Factor System for a Scintillation Device and Method of Operation," filed June 23, 1972, and assigned to the assignee of the present application.

U.S. Patent application Ser. No. 265,624 to Carl J. Brunnett et al., entitled "Automatic Limit Switch System for a Scintillation Device and Method of Operation," filed June 23, 1972, and assigned to the assignee of the present application.

BACKGROUND OF THE INVENTION

This invention pertains to the art of scintillation devices for providing a graphical presentation of the levels of radioactivity over an area, and more particularly, to an information density indicator system for providing a direct indication of the number of electrical pulses representative of the radiation activity which occurs during a predetermined increment of movement of a radiation detection probe.

In the above-referenced patents to Stickney et al., a scintillation device of the type which is generally referred to as a scintillation scanner is disclosed. Generally, in the operation of a scintillation scanner, a scintillation probe is supported on a boom which reciprocates along a series of parallel rectilinear paths to cover a predetermined area of examination. A light source and a stylus are also carried by the boom to reciprocate along paths of travel which correspond to and are parallel to the path of travel of the probe. The light source and stylus are coupled through appropriate circuitry to the scintillation probe to produce graphic images formed by a pattern of dots, on both a film and a sheet of paper, of the levels of radiation activity being measured.

In the medical use of a scintillation scanner, a radioactive isotope is administered to a patient. Isotopes exhibit the characteristic of concentrating in certain types of tissue with the level of concentration dependent upon the type of tissue. These different levels of concentration result in different levels of radiation activity which, when measured and graphically presented, provide a basis for medical diagnosis. The levels of concentration of the isotopes are not only different in different tissues of a single organ, but are also different between similar tissues in similar organs. For this reason, the levels of maximum concentration, or maximum radiation activity, may vary over a wide range for different organs or even for two similar organs.

It has been found that if the scan speed of the scintillation probe is adjusted such that approximately 1,000 radiation counts per centimeter are received by the probe at the position of maximum radiation density, a satisfactory statistical counting average is obtained for the study and the study may be conducted within a satisfactory period of time.

If the scintillation probe is scanned at a higher rate of speed, the statistical average is improved somewhat, however, the length of time required for a given study is increased substantially. Conversely, if the scan speed is increased to a rate of speed such that less than 1,000 counts per centimeter are received at the point of maximum radiation activity, an unsatisfactory statistical counting average occurs. Thus, for optimum performance, the scan speed should be set so that approximately 1,000 counts per centimeter are received at the point of maximum radiation activity, or "hot spot."

In the past, it was necessary to move the detector probe over a "hot spot" and then attempt to read the scale of a rate meter in order to determine the approximate number of counts per minute which occur at the "hot spot." The reading taken from the rate meter was then used to compute the information density by manually dividing the number of counts per minute by the product of one number equal to the line spacing distance and another number equal to the scan speed.

As may be apparent, the procedure of visually reading a rate meter which continues to fluctuate with statistical variations in radiation activity, in order to calibrate the information density, results in numerous calibration inaccuracies. Thus, the readings taken by an operator are at best an approximation of the average number of counts per minute. Also, the inertia in the meter movement of the rate meter adds an additional factor of inaccuracy to these measurements. In addition, the manual multiplication and division which is necessary in order to compute the information density for each diagnostic study was a very time consuming procedure.

SUMMARY OF THE INVENTION

The present invention is directed toward an information density indicator system for providing a direct indication of information density for a predetermined increment of movement of a detection probe, thereby overcoming the noted disadvantages, and others, of such previous systems.

One aspect of the present invention is the provision of an information density indicator system for a scintillation system which includes a selector for selecting one of a plurality of line spacings, a counting circuit for counting the number of electrical pulses representative of radiation activity during a predetermined interval of time, preset logic circuitry for presetting the counting circuit in accordance with a selected line spacing, and indicator means coupled to the counting circuit for providing an output indication representative of the output signal developed by the counting circuit to thereby provide a direct indication of information density.

In accordance with another aspect of the present invention, the counting circuit takes the form of a decade counter and the preset logic circuit provides the function of setting the starting point of the decade counter.

In accordance with another aspect of the present invention, the information density indicator includes a storage register coupled to the counting circuit for storing a pattern of electrical signals representative of the number of electrical pulses counted during a predetermined interval of time, and a digital-to-analog converter for converting the pattern of stored signals to signals of analog form to be applied to the indicator device.

DESCRIPTION OF A PREFERRED EMBODIMENT

Figure 1:
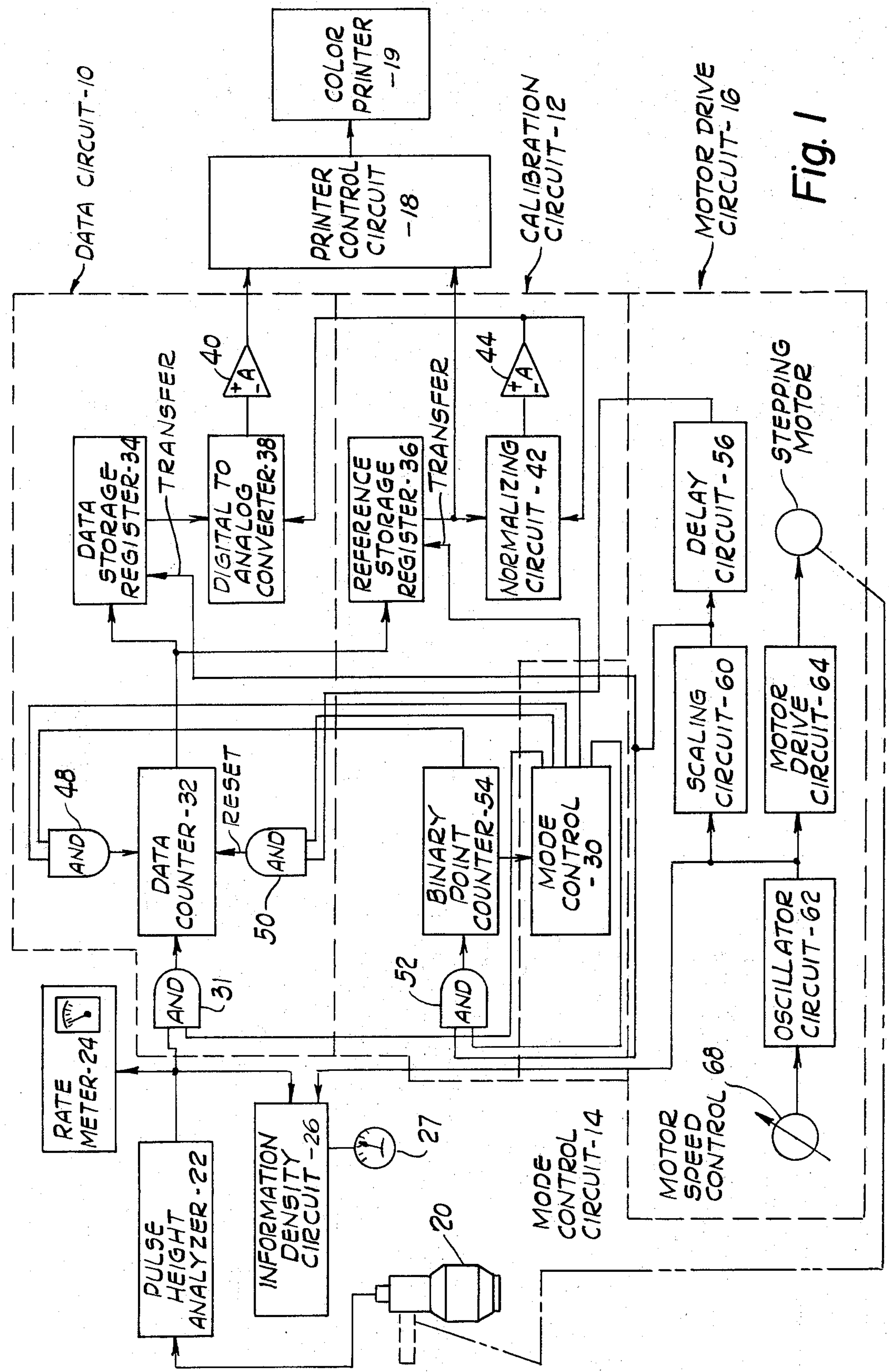
FIG. 1 is an electrical block diagram illustrating in basic form a scintillation scanner including an information density indicator system of the present invention.

FIG. 1 illustrates the information density system in conjunction with a scintillation scanner. The scintillation scanner generally comprises a data circuit 10, a calibration circuit 12, a mode control circuit 14, a motor drive circuit 16, a printer control circuit 18 and a color printer 19. More particularly, the input terminal of the data circuit 10 is coupled through a pulse height analyzer 22 to the output terminal of a radiation detector probe 20. The output terminal of the pulse height analyzer 22 is also connected to a rate meter 24 and to an information density circuit 26. The information density circuit 26 is connected to an information density meter 27. The radiation detector probe 20, pulse height analyzer 22, and rate meter 24 are conventional elements and are described in more detail in the above-referenced U.S. Pat. No. 3,159,744.

As illustrated in FIG. 1, the output terminal of the pulse height analyzer 22 is also connected to one of the input terminals of an AND gate 31 having its other input terminal connected to a mode control circuit 30. The output terminal of AND gate 31 is connected to the input terminal of a data counter 32, and the output terminals of the data counter 32 are connected to a data storage register 34 and to a reference storage register 36.

The output terminals of the data storage register 34 are connected to a digital-to-analog converter 38 having its output terminal connected to the input terminal of a differential amplifier 40. The output terminals of the reference storage register 36 are connected to the input terminals of a normalizing circuit 42 having its output terminal connected to the input of a differential amplifier 44. The output terminal of the differential amplifier 44 is fed back to the digital-to-analog converter 38 and to the normalizing circuit 42 in order to modify the signals developed in these circuits in response to the number of counts stored in the reference storage register 36.

The output terminal of the differential amplifier 40 is coupled to the printer control circuit 18, and the output terminals of the reference storage register 36 are also coupled to the printer control circuit 18. The printer control circuit 18 is coupled to a color printer 19 for controlling the operation of the printer. The printer control circuit 18 and color printer 19 are described in more detail in the above-referenced U.S. Patent applications Ser. Nos. 156,912 and 156,913.

The mode control circuit 30 is generally comprised of circuitry for gating appropriate ones of a plurality of AND gates in response to selected modes of operation, to wit, "calibrate" mode and "normal" mode. The mode control 30 also serves to strobe the reference register 36 at the appropriate time to cause the stored binary-coded-digital information to be transferred from the reference storage register 36 to the normalizing circuit 42.

Accordingly, the mode control circuit 30 in addition to being connected to one of the input terminals of the AND gate 31 is connected to one of the input terminals of the AND gates 48, 50, 52, as well as the transfer terminal of the reference storage register 36. The other input terminal of the AND gate 48 is coupled to the output terminal of a binary point counter 54, the other input terminal of the AND gate 50 is coupled to the output terminal of a delay circuit 56 in the motor drive circuit 16, and the other input terminal of the AND gate 52 is coupled to an output terminal of a scaling circuit 60 in the motor drive circuit 16.

The AND gate 48 is shown as a single AND gate in FIG. 1 for purposes of illustration, but in practice takes the form of a plurality of AND gates. This AND gate sets the binary point in the data counter 32 in response to the number of counts contained in the binary point counter 54. As illustrated, the output terminal of the AND gate 50 is connected to the reset terminal of the data counter 32 and the output terminal of the AND gate 52 is connected to the input terminal of the binary point counter 54. Thus, the mode control 30 gates the AND gate 31 to allow data to be transferred from the pulse height analyzer 22 to the data counter 32, gates the AND gates represented by the AND gate 48 to allow the transfer of binary point data from the binary point counter 54 to the data counter 32, and gates the AND gate 52 to allow data from the scaling circuit 60 to be transferred to the input of the binary point counter 54. Also, the mode control 30 in conjunction with the delay circuit 56 gates the AND gate to reset the data counter 32.

A control line connects the binary point counter 54 to the mode control circuit 30. The output terminal of the scaling circuit 60 is connected to the delay circuit 56 and to the transfer terminal of the data storage register 34.

The input terminal of the scaling circuit 60 is connected to the output of a variable oscillator circuit 62. The variable oscillator circuit 62 is also coupled through a motor drive circuit 64 to a stepping motor 66 for controlling the movement of the detector probe 20 along a rectilinear path of travel. As illustrated, the frequency of the oscillator circuit 62 is controlled by a motor speed control 68 in order to vary the rate of travel of the probe 20. Accordingly, the motor speed control 68 not only varies the rate of travel of the probe 20, but also by setting the frequency of oscillation of the oscillator circuit 62, selects the time interval for counting the data representative of radiation activity.

In operation of the scintillation scanner, the mode control 30 is set to "calibrate" which causes signals to be applied to the AND gates 31 and 52 thereby causing these gates to open and allow data to be transferred through the gates. During the calibration mode, the AND gates 48 and 50 remain closed thereby preventing the transfer of data through these gates.

For automatic calibration, the detector probe 20 is manually positioned over the organ under examination until a maximum reading is obtained by the indicator on the rate meter 24. The electrical pulses developed by the detector probe 20 are then applied through the pulse height analyzer 22 and the AND gate 31 to the data counter 32. The data counter 32 begins counting electrical pulses in the train of pulses for a predetermined integration interval or integration distance.

The integration interval terminates on the occurrence of two events, to wit, the data counter has completed a count of at least 256 counts and the binary point counter 54 has reached a count of $2^N$ where N is an integer. In other words, the data counter 32 continues to count data representative of radiation activity at the "hot spot" until the number of counts in the data counter 32 and binary point counter 54 have satisfied the required conditions. The operation of the data counter 32 and the binary point counter 54 are described in more detail in the above-referenced U.S. Patent application Ser. No. 156,912.

Once the required conditions have been satisfied, AND gates 31 and 52 are closed thereby preventing additional data from being transferred into the data counter 32 and the binary point counter 54. The binary data in the data counter 32 is then transferred to the reference storage register 36 where that information is then stored. Signals representative of the data count stored in the reference storage register 36 are then applied to the normalizing circuit 42, which in turn applies an analog signal through the amplifier 44 to the digital-to-analog converter 38 to modify the signals developed by the digital-to-analog converter 38 during the normal scanning operation.

For normal scanning operation, the mode control 30 is set at "normal operation" which causes the AND gates 31, 48 and 50 to open and the AND gate 52 to remain closed. During normal scanning operation, data from the pulse height analyzer 22 is applied through the AND gate 31 to the data counter 32. The data counter 32 is allowed to count for an integration interval or integration distance which is selected by the motor speed control 68. Thus, after a predetermined number of oscillations by the oscillator circuit 62, the scaling circuit 60 develops a pulse which causes data to be transferred from the data storage register 34 to the digital-to-analog converter 38. After a preselected interval of time, the delay circuit 56 develops a pulse which is applied through the AND gate 50 to reset the data counter 32 for another counting operation over a second time interval. Each time interval is equal to the time the detector probe 20 remains in a given position before being moved by the stepping motor 66 an incremental distance. The data counter 32 is reset at a predetermined delay time after actuation of the stepping motor 66 to the next incremental position.

The binary information from the data storage register 34 is applied to the digital-to-analog converter 38. The converter 38 develops an analog signal having a value representative of the pattern of binary signals applied to the converter. The analog signal developed by the digital-to-analog converter 38 is modified by the signal developed by the amplifier 44 in the calibration circuit 12 so that the analog signal developed by the converter 38 remains within a predetermined range of values even though this signal has a value representative of the data applied to the converter by the data storage register 34. The operation of the digital-to-analog converter 38 and the normalizing circuit 42 are described in more detail in the above-referenced U.S. Pat. application Ser. No. 156,912.

The analog signal developed by the digital-to-analog converter 38 is applied through an amplifier 40 to the printer control circuit 18 for driving the color printer 19.

Thus, the detector probe 20 is positioned over an area of maximum radiation activity or a "hot spot," the probe 20 develops a train of electrical pulses representative of the level of radiation activity measured by the detector, and the data counter 32 counts the number of pulses for a preselected number of intervals of time. The number of counts developed by the data counter 32 is then divided by the number of intervals of counting time by the binary point counter 54 in order to obtain an average number of electrical pulses occurring in one interval of time. By counting over several intervals of time, the average number of electrical pulses may be determined with a high degree of statistical accuracy.

Data representative of the average number of electrical pulses occurring in one interval of time is then stored in the reference storage register 36 and is applied to the normalizing circuit 42 for modifying the signals developed by the analog converter 38 during normal scanning operation. In the normal scanning operation, the radiation detector probe 20 moves along a rectilinear path of travel and is moved for incremental distances after a preselected number of oscillations by the oscillator circuit 62. Each time the detector probe 20 is moved an incremental distance, data which has been accumulated in the data counter 32 at the previous detector location is transferred from the data storage register 34 to the digital-to-analog converter 38. The signal developed by the digital-to-analog converter 38 is modified by the modifying circuit 42 and its associated amplifier 44 so that the value of the output signal developed by the digital-to-analog converter 38 remains within a predetermined range of values and remains representative of the number of counted pulses accumulated at each detector position.

Figure 2A:
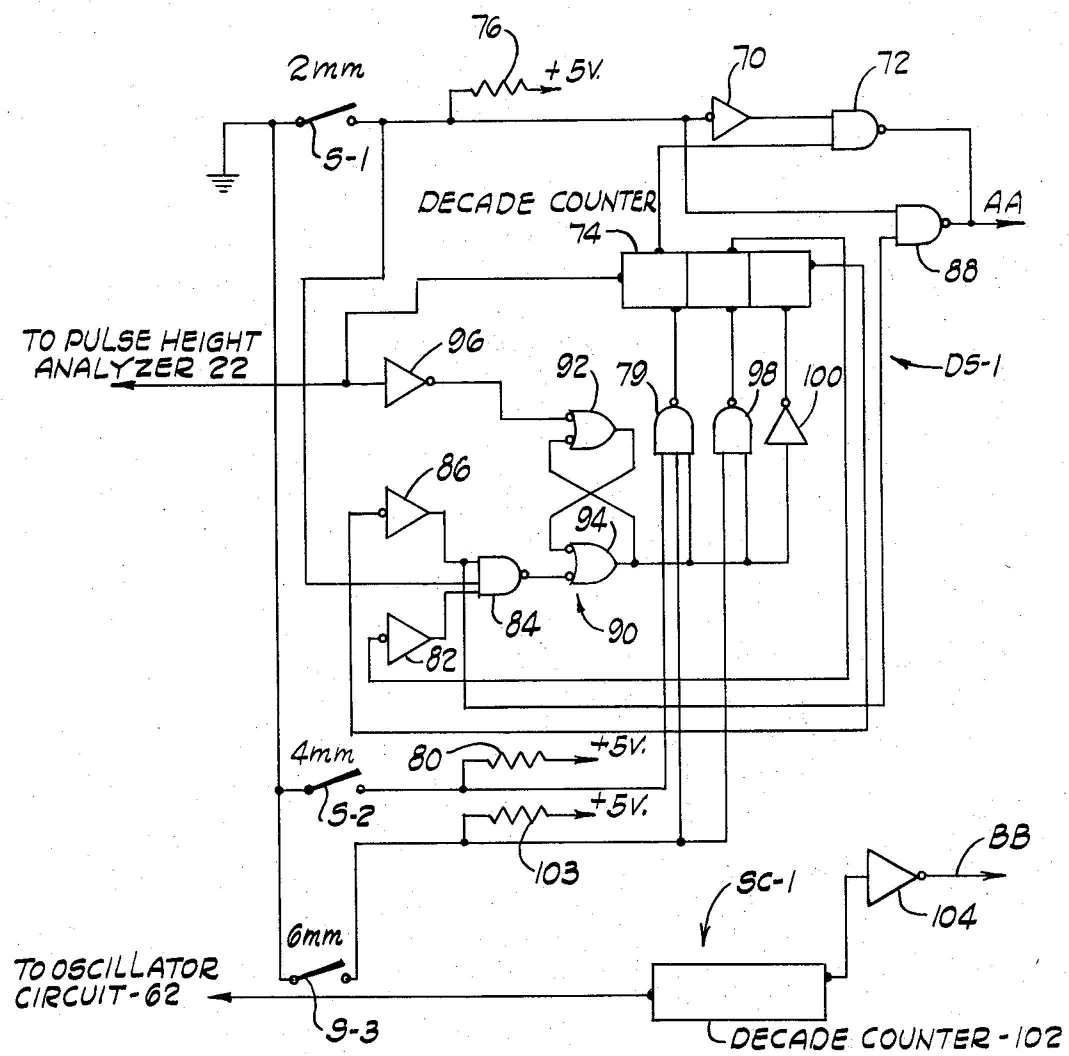
FIGS. 2*a* and 2*b* are electrical schematic diagrams illustrating in more detail the circuitry of the information density system shown in FIG. 1.
Figure 2B:
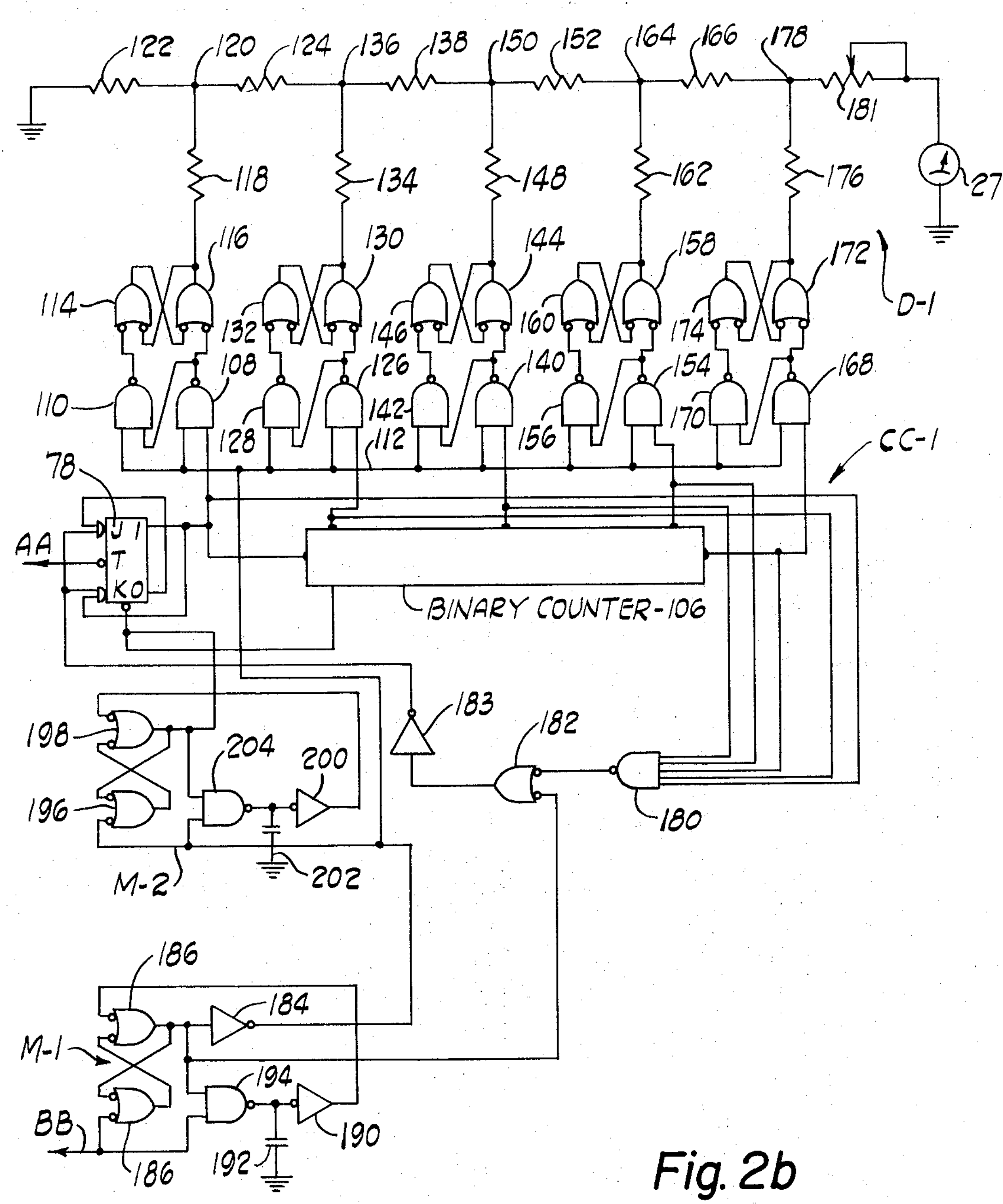

Reference is now made to FIGS. 2*a* and 2*b* which illustrate in more detail the information density circuit 26. The information density circuit 26 includes three line-spacing switches S-1, S-2, S-3, which are coupled to the input of a data scaler DS-1. The output of the data scaler DS-1 is connected to a counting circuit CC-1.

The information density circuit also includes a scan oscillator circuit SC-1 which is coupled to a pair of monostable multivibrators M-1, M-2. The monostable oscillators M-1, M-2 perform the three functions of transferring data from the counter circuit CC-1 to a digital-to-analog converter circuit D-1, inhibiting the counting circuit CC-1 after a predetermined time interval, and resetting the information density circuit 26 for receipt of a second train of data pulses.

The output signals developed by the digital-to-analog converter D-1 are applied to the information density meter 27 for providing a direct reading of information density at a selected position of the radiation detector probe, such as over a "hot spot."

More particularly, one of the terminals of the 2-millimeter line-spacing switch S-1 is connected directly to ground, and the other terminal of this switch is connected to the input terminal of an inverter 70. The output terminal of the inverter 70 is connected to one of the input terminals of a NAND gate 72. The other input terminal of the NAND gate 72 is connected directly to the output terminal of the first stage of a three-stage decade counter 74. The input terminal of the inverter 70 is also connected through a resistor 76 to a positive 5-volt supply source, and the output terminal of the NAND gate 72 is coupled through a conductor AA to the "toggle" terminal of a J-K flip-flop 78.

One of the terminals of the 4-millimeter line-spacing switch S-2 is connected directly to ground, and the other terminal of this switch is connected to a first input terminal of a three-terminal NAND gate 79. This input terminal of NAND gate 79 is also connected through a resistor 80 to the positive 5-volt supply source.

The output terminal of NAND gate 79 is connected directly to the preset terminal of the first stage of the decade counter 74. The output terminal of the second stage of the decade counter 74 is connected through an inverter 82 to a first input terminal of another three-terminal NAND gate 84. Similarly, the output terminal of the third stage of the decade counter 74 is connected through an inverter 86 to a second input terminal of the NAND gate 84. The second input of NAND gate 84 is also connected to one of the input terminals of NAND gate 88 having its output terminal connected directly through the conductor AA to the "toggle" terminal of the J-K flip-flop 78. The other input terminal of the NAND gate 88 is connected to the input terminal of the inverter 70.

The third input terminal of the three-input NAND gate 84 is connected to the input terminal of the inverter 70, and the output terminal of this NAND gate is connected to the "set" terminal of an R-S flip-flop 90. The R-S flip-flop 90 is comprised of a pair of NOR gates 92, 94. The "reset" terminal of the flip-flop 90 is connected to the output terminal of an inverter 96 having its input terminal connected directly to the output terminal of the pulse height analyzer 22. The pulse height analyzer 22 is also connected to the input terminal of the decade counter 74.

As illustrated, the output terminal of the R-S flip-flop 90 is connected to a second input terminal of the NAND gate 79, a first input terminal of another NAND gate 98, and to the input terminal of an inverter 100. The output terminal of the NAND gate 79 is connected to the "preset" terminal of the first stage of the decade counter, the output terminal of the NAND gate 98 is connected to the "preset" terminal of the second stage of the counter 74, and the output terminal of the inverter 100 is connected to the "preset" terminal of the third stage of the counter 74.

One of the terminals of the 6-millimeter line-spacing switch S-3 is connected directly to ground, and the other terminal of this switch is connected to the third input terminal of the three input NAND gate 78 and to the second input terminal of the NAND gate 98. This other terminal of switch S-3 is also connected through a resistor 103 to the positive 5- volt supply source.

The scan oscillator circuit SC-1 includes a decade counter 102 having its input terminal connected to the oscillator circuit 62 and its output terminal connected to the input terminal of an inverter 104. The output terminal of the inverter 104 is connected through the conductor BB to the input terminal of the monostable multivibrator M-1.

As illustrated in FIG. *2b*, the "0" terminal of the J-K flip-flop 78 is coupled back to the "J" terminal of this flip-flop, and the "1" terminal is connected back to the "K" terminal of the flip-flop. The "1" terminal of the flip-flop 78 is also connected to the input terminal of a four-stage binary counter 106.

The terminals of the binary counter 106 are connected to a five-stage binary storage network comprised of NAND and NOR gates. More particularly, the input terminal of the binary counter 106 is connected to one of the input terminals of a NAND gate 108 having its output terminal connected back to the input terminal of another NAND gate 110. The other input terminal of the NAND gate 126 and the other input terminal of NAND gate 110 are connected to a common line 112. The output terminal of the NAND gate 110 is connected to one of the input terminals of a NOR gate 114, and the output terminal of the NAND gate 108 is connected to one of the input terminals of a NOR gate 116. The output terminal of the NOR gate 114 is fed back to the other input terminal of the NOR gate 116, and the output terminal of the NOR gate 116 is fed back and connected to the other input terminal of the NOR gate 114. In addition, the output terminal of the NOR gate 116 is connected through a resistor 118 to a juncture point 120 between a pair of resistors 122, 124. The other terminal of the resistor 122 is connected to ground.

The output terminal of the first stage of the binary counter 106 is connected to one of the input terminals of a NAND gate 126 having its output terminal connected back to the input terminal of another NAND gate 128. The other input terminal of the NAND gate 126 and the other input terminal of NAND gate 128 are connected to a common line 112. The output terminal of the NAND gate 128 is connected to one of the input terminals of a NOR gate 132, and the output terminal of the NAND gate 126 is connected to one of the input terminals of a NOR gate 130. The output terminal of the NOR gate 132 is fed back to the other input terminal of the NOR gate 130, and the output terminal of the NOR gate 130 is fed back and connected to the other input terminal of the NOR gate 132. In addition, the output terminal of the NOR gate 130 is connected through a resistor 134 to a juncture point 136 between the resistor 124 and a resistor 138.

The output terminal of the second stage of the decade counter 106 is connected to one of the input terminals of a NAND gate 140 having its output terminal connected back to the input terminal of another NAND gate 142. The other input terminal of the NAND gate 140 and the other input terminal of NAND gate 142 are connected to a common line 112. The output terminal of the NAND gate 142 is connected to one of the input terminals of a NOR gate 146, and the output terminal of the NAND gate 140 is connected to one of the input terminals of a NOR gate 144. The output terminal of the NOR gate 146 is fed back to the other input terminal of the NOR gate 144, and the output terminal of the NOR gate 144 is fed back and connected to the other input terminal of the NOR gate 146. In addition, the output terminal of the NOR gate 144 is connected through a resistor 148 to a juncture point 150 between the resistor 138 and a resistor 152.

The output terminal of the third stage of the binary counter 106 is connected to one of the input terminals of a NAND gate 154 having its output terminal connected back to the input terminal of another NAND gate 156. The other input terminal of the NAND gate 154 and the other input terminal of NAND gate 156 are connected to a common line 112. The output terminal of the NAND gate 156 is connected to one of the input terminals of a NOR gate 160, and the output terminal of the NAND gate 154 is connected to one of the input terminals of a NOR gate 158. The output terminal of theNOR gate 160 is fed back to the other input terminal of the NOR gate 158, and the output terminal of the NOR gate 158 is fed back and connected to the other input terminal of the NOR gate 160. In addition, the output terminal of the NOR gate 158 is connected through a resistor 162 to a juncture point 164 between the resistor 152 and a resistor 166.

The output terminal of the fourth stage of the binary counter 106 is connected to one of the input terminals of a NAND gate 168, having its output terminal connected back to the input terminal of another NAND gate 170. The other input terminal of the NAND gate 168 and the other input terminal of NAND gate 170 are connected to a common line 112. The output terminal of the NAND gate 170 is connected to one of the input terminals of a NOR gate 174, and the output terminal of the NAND gate 168 is connected to one of the input terminals of a NOR gate 172. The output terminal of the gate 174 is fed back to the other input terminal of the NOR gate 172, and the output terminal of the NOR gate 172 is fed back and connected to the other input terminal of the NOR gate 174. In addition, the output terminal of the NOR gate 172 is connected through a resistor 176 to a juncture point 178 between the resistor 166 and one terminal of a potentiometer 181. The other terminal of the potentiometer 181 is connected through the information density meter 27 to ground.

The "1" terminal of the J-K flip-flop 78 is also connected to one of the input terminals of a five-input NAND gate 180, the output terminal of the first stage of the binary counter 106 is connected to a second input terminal of the NAND gate 180, and the output terminal of the second stage of the binary counter 106 is connected to a third input terminal of the NAND gate 180. In addition, the output terminal of the third stage of the binary counter 106 is connected to a fourth input terminal of the NAND gate 180 and the output terminal of the fourth stage of the binary counter 106 is connected to a fifth input terminal of the NAND gate 180.

As illustrated, the output terminal of NAND gate 108 is connected to one of the input terminals of a NOR gate 182. The other input terminal of the NOR gate 182 is connected directly to the input terminal of an inverter 184 in the monostable multivibrator M-1, and the output terminal of the NOR gate 182 is connected through an inverter 183 to the commonly-connected "J" or "K" terminals of the J-K flip-flop 78.

The monostable multivibrator M-1 includes a pair of NOR gates 186, 188, having their output terminals connected back to one of the input terminals of the other gate. The other input terminal of the NOR gate 186 is connected to the output terminal of an inverter 190 having its input terminals connected through a capacitor 192 to ground, and the other input terminal of the NOR gate 188 is connected to the output terminal of the inverter 104 through the conductor BB.

As illustrated, the output terminal of the NOR gate 186 is connected to the input terminal of the inverter 184. The output terminal of NOR gate 186 is also connected to one of the input terminals of a NAND gate 194. The other input terminal of the NAND gate 194 is connected to the output terminal of the inverter 104 through the conductor BB and the output terminal of this NAND gate is also connected to the input terminal of the inverter 190.

The output terminal of the inverter 184 is connected to one of the input terminals of a NOR gate 196 in the other monostable multivibrator M-2. The other input terminal of the NOR gate 196 is connected to the output terminal of another NOR gate 198 having one of its input terminals connected back to the output terminal of the NOR gate 196. The other input terminal of the NOR gate 198 is connected to the output terminal of an inverter 200 having its input terminal connected through a capacitor 202 to ground.

The multivibrator M-2 also includes a NAND gate 204 having one of its input terminals connected to the output terminal of the NOR gate 198 and its other input terminal connected to the output terminal of the inverter 184 in the multivibrator M-1 and to the common line 112 in the counting circuit CC-1. In addition, the output terminal of the NOR gate 198 is connected to the reset terminal of the J-K flip-flop 78 and to the reset terminal of the decade counter 106.

In the operation of the information density system, the information density circuit 27 develops an output signal representative of information density at the particular location at which the scintillation probe 20 is positioned. Information density may be defined by the following equation:

$$I.D. = \text{Number of counts per minute/Detector Speed} \times \text{Line Spacing}$$

measured in counts per square centimeter. The above formula simplified becomes:

$$I.D. = \text{Counts per centimeter/Line spacing}$$

or in general I.D. is proportional to counts per predetermined increment of detection probe travel devided by the line spacing.

Thus, in order to determine the information density at a given position of the scintillation probe, it is necessary to count the number of pulses which occur during an interval of time corresponding to a predetermined distance of probe travel, and scale down to the number of pulses by a factor proportional to the particular line spacing being utilized. With the circuit of FIGS. 2_a_ and 2_b_, the scale-down operation is performed digitally in order to substantially improve the accuracy of measuring the information density. The digital data is then stored in a counter and in binary storage circuitry, and subsequently converted to analog signals to be applied to the information density meter 27.

With reference to FIGS. 2_a_ and 2_b_, data pulses from the pulse height analyzer 22 are applied to the data scaler circuit DS-1 for performing the scale-down operation. Also, clocking pulses from the oscillator circuit 62 are applied to the scan control circuit SC-1 in order to terminate the counting operation after a preselected interval of time. The scaled-down data pulses developed by the data scale-down circuit DS-1 are clocked into the counting circuit CC-1 for storage and are then converted to analog form by the digital-to-analog converter D-1. The resulting analog signals are then applied to the information density meter 27 for a direct and continuous reading of information density.

More particularly, if the scintillation system is to be operated at a 2 millimeter spacing between scan lines, the 2 millimeter line spacing switch S-1 is closed to thereby apply a binary "0" signal to the NAND gate 84, which in turn inhibits the operation of the bistable multivibrator 90. Thus, data pulses from the pulse height analyzer are effectively applied only to the input terminal of the decade counter 74.

With the line spacing switch S-1 closed, a binary "1" signal is applied to the NAND gate 72 in order to open this gate to allow signals from the output terminal of the first stage of the decade counter 74 to be gated through the gate 72 and applied to the "toggle" terminal of the J-K flip-flop 78. Accordingly, with the 2 millimeter line-spacing switch S-1 closed, the signals applied to the "toggle" terminal of the J-K flip-flop 78 are scaled down by a factor of 2.

With the 4 millimeter line-spacing switch S-2 closed, a binary "0" signal is applied to the NAND gate 72 in order to inhibit pulses from being gated through the NAND gate 72. In addition, with the line-spacing switch S-2 closed, a binary "0" signal is applied to the NAND gate 79 to inhibit the transfer signals through this gate, and a binary "1" signal is applied to the NAND gate 78 to open this gate. With the switch S-2 closed, a binary "1" signal is also applied to the NAND gate 84 in order to open this gate to allow operation of the bistable multivibrator 90 upon receipt of data pulses.

Thus, with the 4 millimeter line-spacing switch S-2 closed, data pulses are applied by the pulse height analyzer 22 to the input terminal of the decade counter 74 and signals are applied to the "preset" terminals of the decade counter through the NAND gate 98 and the inverter 100 in order to advance the counter by six counts. Accordingly, with the 3 stage data counter advanced by six counts, an output pulse is developed by the counter only upon receipt of four input pulses. Reference is made to Table I below which illustrates that the signal developed at the output of the decade counter 74 changes from a binary "0" level to a binary "1" level only one time if the counter is preset or advanced to the sixth count prior to receipt of data pulses.

TABLE I

| No. of Counts | | First Stage | Second Stage | Third Stage |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

With the 6 millimeter line-spacing switch S-3 closed, all of the gates remain in the same condition as with the 4 millimeter switch closed, however, the NAND gate 98 is also inhibited. With the NAND gate 98 inhibited, the decade counter 74 is preset to the fourth count so that the output signal developed by the decade counter changes from a binary "0" level to a binary "1" level only upon the receipt of six input pulses. Accordingly, the signals applied to the "toggle" terminal of the J-K flip-flop 78 may be scaled down by factors of 2, 4, or 6, dependent upon which one of the line-spacing switches is closed.

The pulses applied to the J-K flip-flop 78 are clocked into the decade counter 106 for an interval of time controlled by the oscillator circuit SC-1 and multivibrators M-1, M-2. Thus, the decade counter 102 applies a signal to the multivibrator M-1 after a predetermined number of oscillator pulses have been counted. When this signal is applied to the multivibrator M-1, a signal is applied to the NOR gate 182 to inhibit the J-K flip-flop 78 from applying additional data counts to the decade.

The output of the monostable multivibrator M-1 applies a pulse at the common inputs of gates 110, 108, 128, 126, 142, 140, 156, 154, 172 and 168, resulting in transferring the data from J-K 78 and binary counter to the storage elements including the gates 108 through 174. The multivibrator M-1 also triggers the multivibrator M-2 to cause resetting J-K 78 and binary counter 106.

Once the digital signals have been transferred from the data counter 106 to the storage elements, the signals stored in the storage elements are converted through the digital-to-analog network including the resistors 118, 122, 124, 134, 138, 148, 152, 162, 166, 176 to develop an analog signal which is applied to the information density meter 27 for a direct reading of information density.

Thus, an operator of the scintillation scanner is able to directly read the information density for a given position of the scintillation probe.

Although one embodiment of the invention has been described and illustrated, it is apparent to one skilled in the art that various changes and modifications may be made without departing from the spirit and scope of the invention.

Having thus described our invention, we claim:

1. In a scintillation system, a radiation detector including circuitry for developing a train of electrical pulses representative of the value of radiation activity measured by the detector, the improvement comprising:

counting circuit means coupled to said detector circuitry for developing an output signal having a value which is a function of the number of electrical pulses received during a predetermined interval of time; and, information density indicator means including;

selector means including at least a first and second switch means for selecting one of a plurality of line spacings;

preset logic circuit means coupled to said first and second switch means for, upon closure of said first switch means, presetting said counting circuit means so that said output signal is representative of the number of electrical pulses received divided by a first factor and, upon closure of said second switch means, presetting said counting circuit means so that said output signal is representative of the number of electrical pulses received divided by a second factor; and, indicator means coupled to said counting circuit means for providing an output indicator representative of said output signal to thereby provide an indication of information density.

2. An apparatus as defined in claim 1 wherein said counting circuit means is a decade counter and said preset logic circuit means includes circuit means for setting the starting point of said counter.

3. An apparatus as defined in claim 2 including a storage register coupled to said counting circuit means for storing a pattern of electrical signals representative of the number of counts per interval of time; and, digital-to-analog converter means for converting said pattern of stored signals to signals of analog form to be applied to said indicator means.

4. An apparatus as defined in claim 1 wherein said preset logic circuit means includes a third switch means, for upon closure of said third switch means, presetting said counting circuit means so that said output signal is representative of the number of electrical pulses received divided by a third factor.

5. An apparatus as defined in claim 4 wherein said counting circuit means is a decade counter and said preset logic circuit means includes circuit means for setting the starting point of said counter.

6. An apparatus as defined in claim 5 including a storage register coupled to said counting circuit means for storing a pattern of electrical signals representative of the number of counts per interval of time; and, digital-to-analog converter means for converting said pattern of stored signals to signals of analog form to be applied to said indicator means.

7. An apparatus as defined in claim 1 wherein said first factor is N and said second factor is the sum of N and M where N and M are any integer.

8. A scintillation system comprising:

a radiation detector including circuitry for developing electrical pulses representative of the value of radiation activity measured by the detector;

counting circuit means coupled to said detector circuitry for developing an output signal having a value representative of the number of electrical pulses received;

information density indicator means for modifying an output signal developed by said counting circuit means including:

selector means for selecting one of a plurality of distances between lines of scan;

circuit means coupled to said selector means and said counting circuit means for modifying the value of said output signal developed by said counting circuit means in accordance with a selected one of said plurality of line distances; and, indicator means coupled to said counting circuit means for providing an output indicator representative of said output signal to thereby provide an indication of information density.

9. An apparatus as defined in claim 8 wherein said counting circuit means is a decade counter and said preset logic circuit means includes circuit means for setting the starting point of said counter.

10. An apparatus as defined in claim 9 including a storage register coupled to said counting circuit means for storing a pattern of electrical signals representative of the number of counts per inteval of time; and, digital-to-analog converter means for converting said pattern of stored signals to signals of analog form to be applied to said indicator means.

11. An apparatus as defined in claim 8 wherein said preset logic circuit means includes a third switch means, for upon closure of said third switch means, presetting said counting circuit means so that said output signal is representative of the number of electrical pulses received divided by a third factor.

12. An apparatus as defined in claim 11 wherein said counting circuit means is a decade counter and said preset logic circuit means includes circuit means for setting the starting point of said counter.

13. An apparatus as defined in claim 12 including a storage register coupled to said counting circuit means for storing a pattern of electrical signals representative of the number of counts per interval of time; and, digital-to-analog converter means for converting said pattern of stored signals to signals of analog form to be applied to said indicator means.

14. An apparatus as defined in claim 8 wherein said first factor is N and said second factor is the sum of N and M where N and M are any integer.

15. A method of obtaining a direct reading of information density in a scintillation system comprising the steps of:

developing a train of electrical pulses representative of the value of radiation activity;

developing an output signal having a value which is a function of the number of electrical pulses received during a predetermined interval of time;

selecting one of a plurality of line spacings;

presetting said counting circuit means in accordance with a selected line spacing so that said output signal is representative of the number of electrical pulses received divided by a factor representative of a selected line spacing; and, providing an output indication representative of said output signal to thereby provide an indication of information density.

* * * * *